United States Patent
Komiya et al.

(10) Patent No.: US 9,802,480 B2
(45) Date of Patent: Oct. 31, 2017

(54) HIGH-PRESSURE TANK

(71) Applicant: TOYOTA JIDOSHA KABUSHIKI KAISHA, Toyota-shi, Aichi-ken (JP)

(72) Inventors: Kenji Komiya, Nagoya (JP); Masaaki Kondo, Owariasahi (JP); Akira Yamashita, Toyota (JP); Shuusuke Inagi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 58 days.

(21) Appl. No.: 14/934,726

(22) Filed: Nov. 6, 2015

(65) Prior Publication Data

US 2016/0137056 A1 May 19, 2016

(30) Foreign Application Priority Data

Nov. 14, 2014 (JP) .................................. 2014-231825

(51) Int. Cl.
  *B60K 15/04* (2006.01)
  *F17C 1/00* (2006.01)
  (Continued)

(52) U.S. Cl.
  CPC ................ *B60K 15/04* (2013.01); *F17C 1/00* (2013.01); *F17C 13/026* (2013.01); *F17C 13/04* (2013.01);
  (Continued)

(58) Field of Classification Search
  CPC .. F17C 1/00; F17C 1/16; F17C 13/026; F17C 13/04; F17C 2203/0604; F17C 2203/0663;
  (Continued)

(56) References Cited

U.S. PATENT DOCUMENTS

2007/0240770 A1* 10/2007 Yamashita .............. F17C 13/04
  137/505.14
2008/0111322 A1* 5/2008 Otsubo ............... F16L 55/1108
  277/654
(Continued)

FOREIGN PATENT DOCUMENTS

CA    2 753 588       3/2013
CN    101006305 A     7/2007
(Continued)

OTHER PUBLICATIONS

English-language partial translation of Chinese Office Action referring to CN202993702U dated Jun. 12, 2013.

Primary Examiner — Timothy L Maust
Assistant Examiner — Andrew Schmid
(74) Attorney, Agent, or Firm — Finnegan, Henderson, Farabow, Garrett & Dunner, LLP

(57) ABSTRACT

Provided is a high-pressure tank that includes a tank main body including a mouthpiece, a valve fitted to the mouthpiece, and a pipe extending from the valve in an axially inward direction of the tank main body and for ejecting a gas into the tank main body. The pipe includes an ejection nozzle provided at an end of the pipe and for ejecting the gas, a first bent portion located between the ejection nozzle and the valve and extending in a direction inclined relative to an axial direction of the tank main body, and a second bent portion having the ejection nozzle and extending in a direction inclined relative to the axial direction. One of an inclination angle of the first bent portion relative to the axial direction and an inclination angle of the second bent portion relative to the axial direction is larger than 0° and not larger than 90°, and the other is not smaller than −0° and smaller than 0°, when the pipe is viewed in a direction perpendicular to the axial direction.

3 Claims, 4 Drawing Sheets

(51) Int. Cl.
*F17C 13/02* (2006.01)
*F17C 13/04* (2006.01)
*F17C 1/16* (2006.01)

(52) U.S. Cl.
CPC ........ *F17C 1/16* (2013.01); *F17C 2203/0604* (2013.01); *F17C 2203/0619* (2013.01); *F17C 2203/0663* (2013.01); *F17C 2203/0673* (2013.01); *F17C 2205/0305* (2013.01); *F17C 2205/0323* (2013.01); *F17C 2221/012* (2013.01); *F17C 2221/033* (2013.01); *F17C 2223/0123* (2013.01); *F17C 2223/0153* (2013.01); *F17C 2223/0161* (2013.01); *F17C 2223/033* (2013.01); *F17C 2223/035* (2013.01); *F17C 2223/036* (2013.01); *F17C 2223/045* (2013.01); *F17C 2223/047* (2013.01); *F17C 2250/0439* (2013.01); *F17C 2270/0178* (2013.01); *Y02E 60/321* (2013.01)

(58) Field of Classification Search
CPC ...... F17C 2203/0673; F17C 2205/0305; F17C 2205/0323; F17C 2223/0123; F17C 2223/0153; F17C 2223/0161; F17C 2223/033; F17C 2223/035; F17C 2223/036; F17C 2223/045; F17C 2223/047
USPC .......................................................... 141/95
See application file for complete search history.

(56) References Cited

U.S. PATENT DOCUMENTS

| | | |
|---|---|---|
| 2010/0155404 A1 | 6/2010 | Friedlmeier |
| 2014/0223992 A1 | 8/2014 | Harper et al. |
| 2014/0352817 A1 | 12/2014 | Suzuki et al. |

FOREIGN PATENT DOCUMENTS

| | | |
|---|---|---|
| CN | 202993702 U | 6/2013 |
| JP | 2003-194299 A | 7/2003 |
| JP | 2005-201342 A | 7/2005 |
| JP | 2010-529385 A | 8/2010 |
| JP | 2013-64440 | 4/2013 |
| WO | WO 2013/044331 A1 | 4/2013 |

\* cited by examiner

HIGH-PRESSURE TANK

BACKGROUND OF THE INVENTION

Field of the Invention

The present invention relates to a high-pressure tank.

Background Art

As the containers for storing a high-pressure fuel gas (hydrogen gas) used for generating electric power with a fuel cell, high-pressure tanks produced by using a resin material for weight reduction are known. More specifically, a high-pressure tank having the structure produced by covering a thin-walled container (liner) made of a synthetic resin and including a housing space for storing hydrogen gas inside the container, with a layer reinforced by a fiber-reinforced resin and then curing the resin is known.

As the valve for filling such a high-pressure tank with a gas, for example, Patent Document 1 discloses a valve that includes a temperature sensor and can measure and monitor the temperature of gas in a tank when the tank is filled with the gas. Patent Document 1 describes an ejection nozzle through which a gas is ejected in a direction inclined relative to the axial direction of a tank in order to equalize the temperature distribution in the tank.

CITATION LIST

Patent Document(s)

[Patent Document 1] JP-A2013-64440 A

SUMMARY OF THE INVENTION

Here, the inventors have intended to elongate a pipe from a valve to provide a gas ejection nozzle in order to space the gas ejection nozzle a predetermined distance apart from the valve in the axial direction of a tank and to incline the gas ejection nozzle relative to the axial direction of the tank. In such a case, the inventors have found that an ejected gas may vibrate the pipe to make a strange sound.

In view of the above circumstances, it is an object of the present invention to provide a high-pressure tank capable of suppressing a strange sound due to vibrations of a pipe.

In order to solve the problem, according to a preferred aspect of the present invention, a high-pressure tank includes a tank main body including a mouthpiece, a valve fitted to the mouthpiece, and a pipe extending from the valve in an axially inward direction of the tank main body and for ejecting a gas into the tank main body. The pipe includes an ejection nozzle provided at an end of the pipe and for ejecting the gas, a first bent portion located between the ejection nozzle and the valve and extending in a direction inclined relative to an axial direction of the tank main body, and a second bent portion having the ejection nozzle and extending in a direction inclined relative to the axial direction. One of an inclination angle of the first bent portion relative to the axial direction and an inclination angle of the second bent portion relative to the axial direction is larger than 0° and not larger than 90°, and the other is not smaller than −90° and smaller than 0°, when the pipe is viewed in a direction perpendicular to the axial direction.

With the structure, the valve is fitted to the mouthpiece of the tank main body; from the valve, the pipe extends in the axially inward direction of the tank main body; and from the ejection nozzle of the pipe, a gas is ejected into the tank main body. Accordingly, the gas is filled in the tank main body. Here, the ejection nozzle is provided at the end of the second bent portion that extends in a direction inclined relative to the axial direction of the tank main body. The gas ejected into the tank main body thus flows in a direction inclined relative to the axial direction of the tank main body and is reflected from the wall of the tank main body. This generates a vortex between the gas that has been present in the tank main body and the freshly filled gas and suppresses a local increase in temperature in the tank main body due to adiabatic compression associated with high-pressure filling. Consequently, the temperature distribution in the tank main body is equalized.

The pipe includes two bent portions, the first bent portion and the second bent portion. In other words, the pipe is bent at least twice in directions inclined relative to the axial direction and extends in the axially inward direction of the tank main body. One of the inclination angle of the first bent portion relative to the axial direction and the inclination angle of the second bent portion relative to the axial direction is larger than 0° and not larger than 90°, and the other is not smaller than −90° and smaller than 0°. The bent angles of the first bent portion and the second bent portion have opposite signs relative to the axial direction of the tank, and thus the pipe forms a substantially U-shaped configuration between the first bent portion and the second bent portion. Due to this configuration, the pipe has higher rigidity and is unlikely to be distorted, and the force from an ejected gas to the pipe is efficiently dispersed. This can prevent the pipe from vibrating or making a strange sound. In addition, the pipe has the substantially U-shaped configuration between the first bent portion and the second bent portion, and this can prevent the pipe from extending toward the radial direction of the tank main body.

The tank may further include a temperature sensor extending from the valve in the axially inward direction of the tank main body, and a tip of the temperature sensor may be located between the ejection nozzle of the pipe and the valve.

With the structure, the temperature sensor extends from the valve in the axially inward direction of the tank main body and is located. The temperature sensor is thus unlikely to be affected by heat (chilliness) from the valve. In addition, the tip of the temperature sensor is located between the ejection nozzle of the pipe and the valve, and this can prevent direct ejection of a gas from the ejection nozzle of the pipe to the temperature sensor, enabling more accurate determination of the temperature in the tank main body.

When such a virtual cylinder that a fitting portion where the valve is fitted to the mouthpiece is a bottom face and a side face of the fitting portion extends in the axial direction is imagined, the pipe and the temperature sensor may be located within the virtual cylinder.

With the structure, the pipe and the temperature sensor are not positioned outside the fitting portion in the radial direction when viewed from the axial direction. On this account, when the valve is inserted from the mouthpiece of the tank main body along the axial direction, the pipe and the temperature sensor are prevented from hitting the mouthpiece and from being scratched.

The present invention can provide a high-pressure tank capable of suppressing a strange sound due to vibrations of a pipe.

DESCRIPTION OF THE PREFERRED EMBODIMENTS

Figure 1:
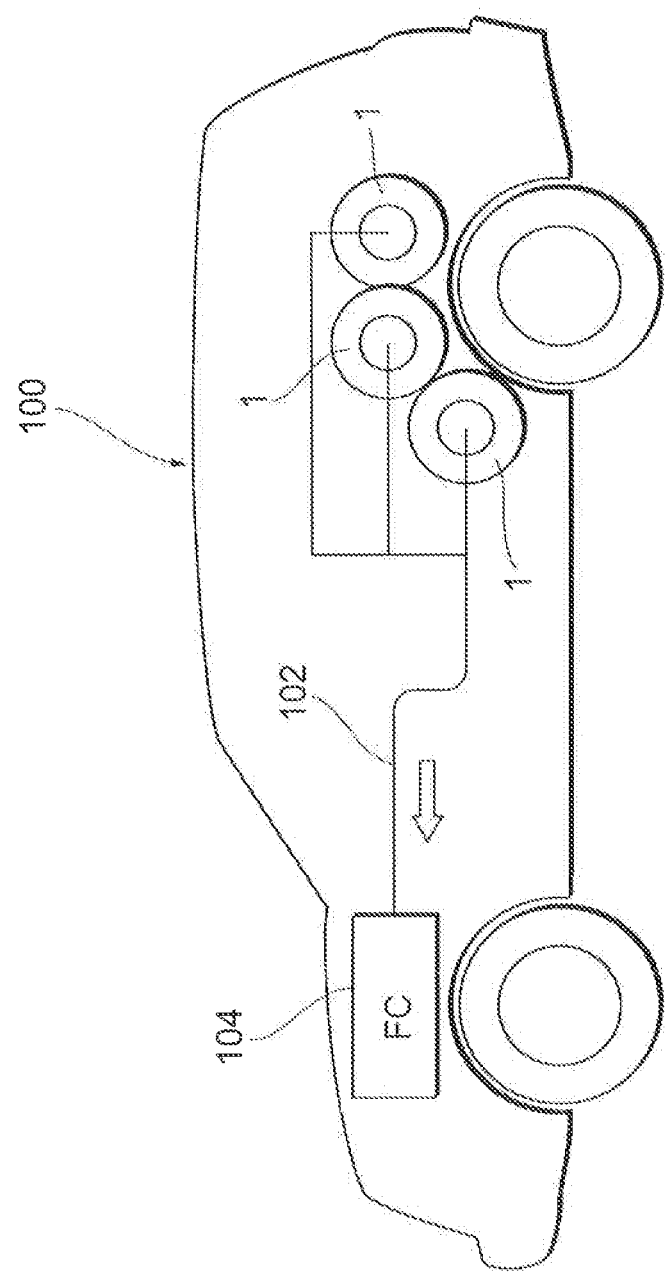
FIG. 1 is a view showing a fuel cell vehicle equipped with high-pressure tanks of a present embodiment.

Embodiments of the present invention will now be described in detail. In the drawings, the positional relations in terms of top, bottom, left, and right, for example, are based on the positional relations shown in the drawings unless otherwise specified. The dimensional ratios in the drawings are not necessarily limited to the ratios shown in the drawings. To make it easy to understand the descriptions, the same or similar elements in the drawings are indicated by the same or similar signs as possible, and duplicate descriptions are omitted. The following embodiments are exemplary embodiments for describing the present invention, and the present invention is not intended to be limited to these embodiments. The present invention can be variously modified without departing from the scope of the invention.

FIG. 1 is a view showing a fuel cell vehicle equipped with high-pressure tanks 1 of the present embodiment. The fuel cell vehicle 100 is equipped with, for example, three high-pressure tanks 1 in a rear part of a vehicle body. Each high-pressure tank 1 constitutes a part of a fuel cell system and is configured to be capable of supplying a fuel gas to a fuel cell 104 through a gas supply line 102. The fuel gas stored in the high-pressure tank 1 is a flammable high-pressure gas, which is exemplified by compressed natural gas and hydrogen gas. The high-pressure tank 1 can be applied to not only fuel cell vehicles but also vehicles such as pure electric vehicles and hybrid electric vehicles, various movable bodies (for example, ships, airplanes, and robots), and stationary systems. The gas to be stored can include various compressed gases such as compressed natural gas (CNG) and various liquefied gases such as liquefied natural gas (LNG) and liquefied petroleum gas (LPG), for example.

Figure 2:
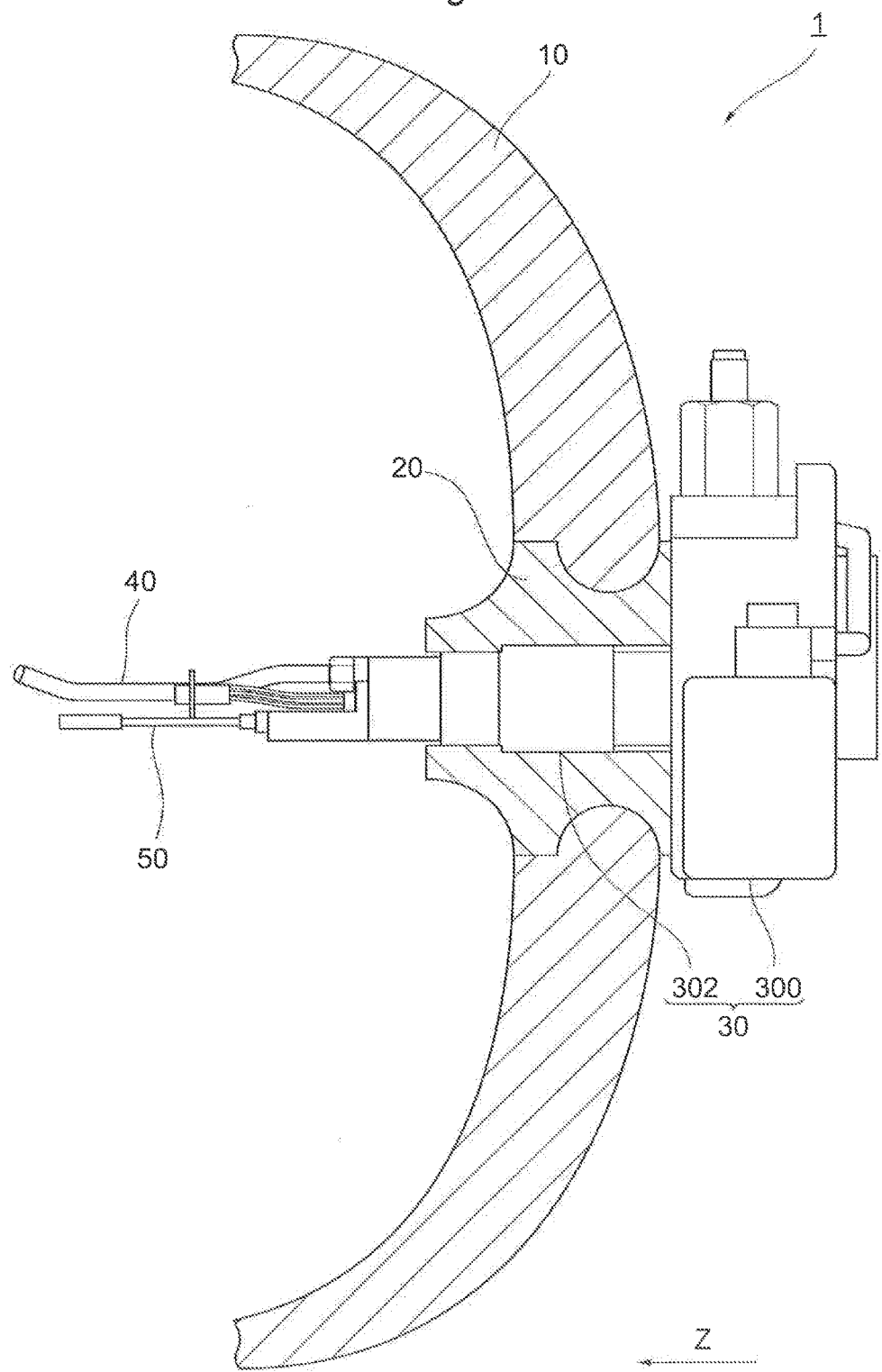
FIG. 2 is a diagram illustrating main elements of the high-pressure tank.

As shown in FIG. 2, the high-pressure tank 1 includes a tank main body 10, a mouthpiece 20, a valve 30, a pipe 40, a temperature sensor 50, and other members.

The tank main body 10 has a substantially ellipsoidal shape as a whole and includes a storage space for storing a fuel gas at a pressure higher than a normal pressure, in the inside. For example, hydrogen gas or compressed natural gas is stored in the storage space at a pressure of, for example, 35 MPa to 70 MPa. The tank main body includes a two-layered wall, for example, and the wall includes a liner as the inner wall layer and a resin fiber layer (reinforcement layer) as the outer wall layer on the outside of the liner. The material for the liner is exemplified by polyethylene resins, polypropylene resins, and other hard resins. The liner may be configured as a laminate including a plurality of layers in which these resins are combined to form two or more layers. The reinforcement layer is, for example, a FRP (CFRP) layer produced by reinforcing a matrix resin (plastic) with carbon fibers. Examples of the matrix resin include epoxy resins, modified epoxy resins, unsaturated polyester resins, and polypropylene resins.

The mouthpiece 20 includes an opening having a substantially cylindrical shape and is fitted in the tank main body 10 (between the liner and the reinforcement layer) to be fixed. The opening of the mouthpiece 20 functions as the opening of the high-pressure tank 1. On the inner peripheral face of the opening in the mouthpiece 20, an attachment portion (for example, an internal thread, which is not shown in drawings) is formed, and the valve 30 is detachably attached. In the present embodiment, the mouthpiece 20 is formed of stainless steel, but may be formed of another metal such as aluminum or a resin material.

The valve 30 includes a valve main body 300 and a valve tube 302. The valve main body 300 is connected to the external gas supply line 102 (see FIG. 1) and is allowed to supply a fuel gas stored in the tank main body 10 when the fuel is used. When a fuel is filled, the valve main body 300 is connected to an external fuel (hydrogen) station (not shown in drawings), for example, and is allowed to fill the fuel gas. On the outer peripheral face of the valve tube 302, an attachment portion (for example, an external thread, which is not shown in drawings) is formed, and is fitted to the attachment portion formed on the mouthpiece 20, thereby positioning the valve 30 with respect to the tank main body 10. The structure of attaching and detaching the valve 30 to and from the mouthpiece 20 is not limited to the above, and other structures can be adopted. For example, the mouthpiece 20 can be provided with a sealing member for shaft sealing between the inner peripheral face of the mouthpiece 20 and the valve 30.

To the valve tube 302, a pipe 40 and a temperature sensor 50 that extend in the axial direction (the direction indicated by Z in FIG. 2; the same is applied in the following drawings; also simply called "axial direction" in the description) of the tank main body 10 are connected. The pipe 40 and the temperature sensor 50 will next be described in detail with reference to FIG. 3 and FIG. 4.

The pipe 40 includes a first connection portion 406, a first bent portion 404, a second connection portion 402, and a second bent portion 400 from the valve tube 302 toward the tip of the pipe 40 and is fitted (screwed here) at one end of the first connection portion 406 to the valve tube 302 to be fixed.

Figure 4:
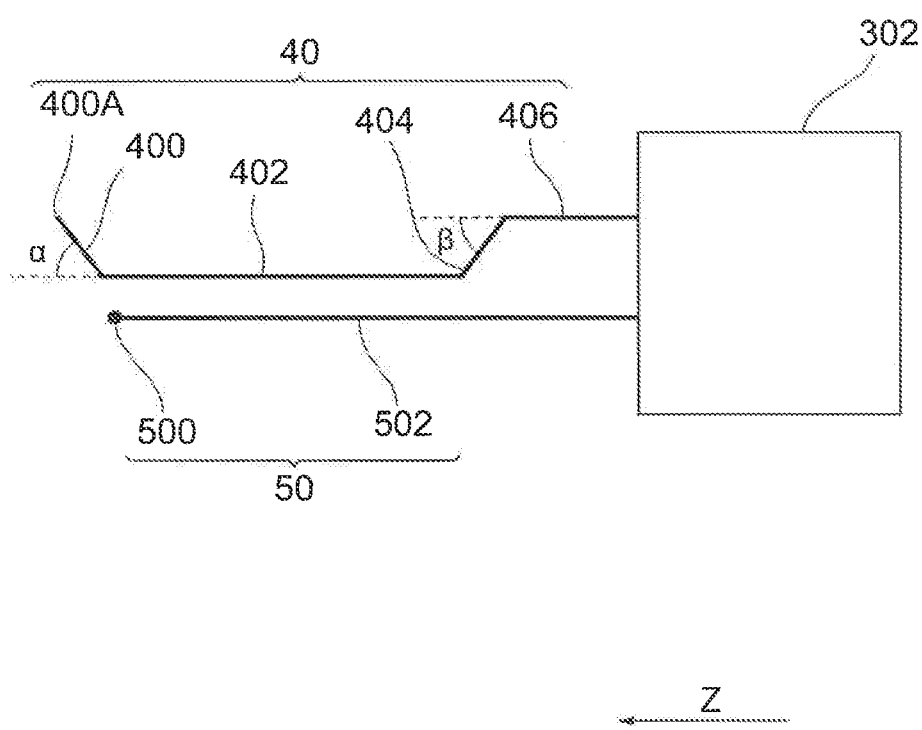
FIG. 4 is a schematic view illustrating the positional relation between a pipe and a temperature sensor.

As shown in FIG. 4, the first bent portion 404 is bent at an angle of $\beta$ ($-90° \leq \beta < 0°$, for example, $-45°$ in the present embodiment) with respect to the axial direction, and the second bent portion 400 of the pipe 40 is bent at an angle of $\alpha$ ($0° < \alpha \leq 90°$; for example, $45°$ in the present embodiment) with respect to the axial direction. The first connection portion 406 and the second connection portion 402 of the pipe 40 extend in parallel with the axial direction. In other words, the pipe 40 extends in the axially inward direction of the tank main body 10 while bended at least twice in directions inclined relative to the axial direction. Accordingly, the pipe has a substantially U-shaped configuration between the first bent portion 404 and the second bent portion 400, and the pipe 40 has higher rigidity. The pipe 40 is thus unlikely to be distorted, and this can prevent the pipe from vibrating or making a strange sound due to an ejected gas. The pipe has the substantially U-shaped configuration between the first bent portion 404 and the second bent portion 400, and this can prevent the pipe from extending toward the radial direction of the tank main body 10 although the pipe is banded twice. The force from an ejected gas is applied to the pipe 40 in different directions between the first bent portion 404 and the second bent portion 400, and thus the force is efficiently dispersed. This further prevents the pipe 40 from vibrating or making a strange sound. The first connection portion 406 and the second connection portion 402 do not necessarily extend in parallel with the axial direction.

At one end of the second bent portion 400 (the tip of the pipe 40), a fuel gas ejection nozzle 400A is provided, so that a fuel gas is ejected into the storage space of the tank main body 10 in a direction inclined relative to the axial direction (at an angle indicated by a in FIG. 4). The fuel gas flows in a direction inclined relative to the axial direction and is reflected from the inner wall of the tank main body 10. This generates a vortex between the fuel gas that has been present in the tank main body and the freshly filled fuel gas and suppresses a local increase in temperature in the tank main body 10 due to adiabatic compression associated with high-pressure filling. Consequently, the temperature distribution in the tank main body 10 is equalized. In addition, the gas to be ejected into the tank main body 10 hits the second bent portion 400 to reduce the flow rate, and thus the temperature sensor 50 is prevented from breaking even when the gas is ejected around the temperature sensor 50.

In this case, the ejection nozzle 400A is located at a position spaced apart from the valve, and thus a vortex is readily generated in the tank main body 10, thereby further equalizing the temperature distribution in the tank main body.

Figure 3:
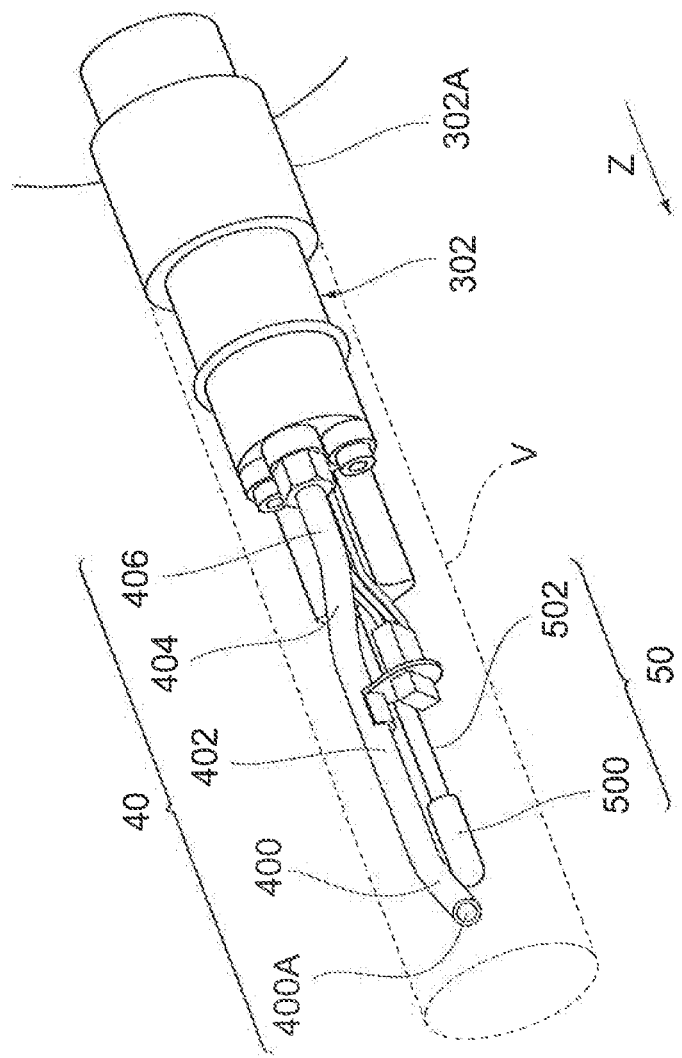
FIG. 3 is a perspective view of a main part of the high-pressure tank.

As shown in FIG. 3 and FIG. 4, the temperature sensor 50 includes a leading portion 500 that has one end attached to the valve 30 and extends in the axial direction and a sensor element 502 that connects to the other end of the leading portion 500 and is for measuring the gas temperature in the tank main body 10. The sensor element 502 is sufficiently spaced apart from the valve 30 but is located close to the valve 30 from the ejection nozzle 400A of the second bent portion 400 (in the embodiment, near the connection point between the second bent portion 400 and the second connection portion 402 of the pipe 40). The temperature sensor 50 is thus unlikely to be affected by chilliness from the valve 30. Such a structure can prevent direct ejection of a gas from the ejection nozzle 400A of the pipe 40 to the temperature sensor 50. In addition, as described above, a fuel gas is ejected in a direction inclined relative to the axial direction, and thus the temperature distribution in the tank main body 10 is equalized. On this account, the temperature sensor 50 is configured to be capable of measuring a mean temperature in the tank main body 10 more accurately.

Accurate measurement of a mean temperature in the tank main body 10 is important from the following viewpoints. In other words, communication fueling for rapid fueling in the high-pressure tank 1 has been studied and developed in order to popularize and improve fuel cell vehicles. In the communication fueling, tank information including a gas mean temperature in the tank main body 10 is sent to a fuel station, and the fuel station determines the completion of fueling (full load) on the basis of a dispenser pressure and a mean temperature in the tank main body 10. On this account, accurate measurement of a mean temperature in the tank main body 10 enables more accurate detection of the degree of fueling in the tank main body 10.

When such a virtual cylinder (column) V that a fitting portion 302A where the valve tube 302 is fitted to the mouthpiece 20 is a bottom face and the side face of the fitting portion 302A extends in the axial direction is imagined as shown in FIG. 3, the pipe 40 and the temperature sensor 50 is located within the virtual cylinder V. In other words, the pipe 40 and the temperature sensor 50 are not positioned outside the fitting portion 302A in the radial direction when viewed from the axial direction. On this account, when the valve 30 is inserted from the mouthpiece 20 along the axial direction, the pipe 40 and the temperature sensor 50 are prevented from hitting the mouthpiece 20 and from being scratched.

REFERENCE SIGNS LIST 1 high-pressure tank, 10 tank main body, 20 mouthpiece, 30 valve, 300 valve main body, 302 valve tube, 302A fitting portion, 40 pipe, 406 first connection portion, 404 first bent portion, 402 second connection portion, 400 second bent portion, 400A ejection nozzle, 50 temperature sensor, 500 leading portion, 502 sensor element, 100 fuel cell vehicle, 102 gas supply line, 104 fuel cell, V virtual cylinder (column)

What is claimed is:

1. A high-pressure tank comprising:
    a tank main body including a mouthpiece;
    a valve fitted to the mouthpiece; and
    a pipe extending from the valve in an axially inward direction of the tank main body and for ejecting a gas into the tank main body,
    the pipe including
        an ejection nozzle provided at an end of the pipe and for ejecting the gas,
        a first bent portion located between the ejection nozzle and the valve and having an external form of the pipe extending in a direction inclined relative to an axial direction of the tank main body,
        a second bent portion having the ejection nozzle and having an external form of the pipe extending in a direction inclined relative to the axial direction, and
        a connection portion located between the first bent portion and the second bent portion and having an external form of the pipe extending in parallel with the axial direction,
        one of an inclination angle of the first bent portion relative to the axial direction and an inclination angle of the second bent portion relative to the axial direction being larger than 0° and not larger than 90°, and the other being not smaller than −90° and smaller than 0°, when the pipe is viewed in a direction perpendicular to the axial direction.

2. The high-pressure tank according to claim 1, further comprising a temperature sensor extending from the valve in the axially inward direction of the tank main body, wherein a tip of the temperature sensor is located between the ejection nozzle of the pipe and the valve.

3. The high-pressure tank according to claim 2, wherein when such a virtual cylinder that a fitting portion where the valve is fitted to the mouthpiece is a bottom face and a side face of the fitting portion extends in the axial direction is imagined, the pipe and the temperature sensor are located within the virtual cylinder.

* * * * *